United States Patent [19]

Peile

[11] Patent Number: 4,821,289

[45] Date of Patent: Apr. 11, 1989

[54] MULTIPLE PARALLEL CHANNEL EQUALIZATION ARCHITECTURE

[75] Inventor: Robert E. Peile, Pasadena, Calif.

[73] Assignee: Cyclotomics, Inc., Berkeley, Calif.

[21] Appl. No.: 135,807

[22] Filed: Dec. 21, 1987

[51] Int. Cl.$^4$ .............................................. H04B 3/14
[52] U.S. Cl. ....................................... 375/14; 375/102; 333/18; 364/724.2
[58] Field of Search .................................... 375/14–16, 375/11, 102, 1; 333/18; 364/724, 724.2

[56] References Cited

U.S. PATENT DOCUMENTS 3,906,347 9/1975 Motley et al. ......................... 333/18
4,644,562 2/1987 Kavehrad et al. ..................... 375/14

Primary Examiner—Benedict V. Safourek
Assistant Examiner—Marianne Huseman
Attorney, Agent, or Firm—Robert M. Wallace

[57] ABSTRACT

The n symbols of a codeword of length n are transmitted on n separate channels or frequencies simultaneously. A receiver includes n equalizers that are adapted to receive information from respective ones of the n channels. The outputs of the n equalizers are applied to n inputs of an error correcting decoder which produces the original version of the transmitted codeword. The n equalizers include n feedforward and n feedback transversal filters whose taps are updated by n tap update processors in accordance with a Kalman algorithm, or the like, once each codeword time. The feedforward registers contain successively received signal samples of each of the n channels while the n decision feedback registers contain successively corrected symbols generated at each of the n decoder outputs.

8 Claims, 2 Drawing Sheets

MULTIPLE PARALLEL CHANNEL EQUALIZATION ARCHITECTURE

RELATED APPLICATIONS

The subject matter of this application is related to subject matter contained in U.S. patent application Ser. No. 135,796 filed Dec. 21, 1987, by Robert E. Peile and entitled "Parallel Channel Equalizer Architecture".

BACKGROUND OF THE INVENTION

In high frequency communications, fading and channel noise may vary in time and be different for different frequencies within a band of frequencies. Thus, within the band, some of the frequencies will be usable and others unusable at any given instant in time. Which frequencies are actually most useful is unpredictable. At any given instant in time and within a given high frequency band, there will always be a maximum usable frequency, which is an unpredictable variable defining a frequency neighborhood in which reliable communication may best be carried at that instant in time. The multi-path fading effects at high frequencies can be very severe and quickly varying. Furthermore, as the most usable frequency deviates away from a fixed frequency, the multi-path conditions on that frequency will vary. Typically, the most usable frequency will drift among all the frequencies in the high frequency band of interest.

PROBLEM TO BE SOLVED

The problem is how to maintain reliable communications through a high frequency band under such unfavorable conditions.

PROPOSED ATTACK ON THE PROBLEM BY OTHERS

Channel noise and multi-path fading for high frequency communications are problems which have been alleviated, at least in part, by the use of equalizers or transversal filters whose tap coefficients are determined in accordance with (for example) a least means square algorithm. In such an algorithm, the difference between a predictive correction to each signal sample generated by the transversal filter and the actual received sample is minimized. One algorithm of proven use is the Kalman algorithm. Unfortunately, this type of approach works for a given carrier frequency in the band, and therefore necessarily ignores the fact that the most usable frequency varies in time across the band.

Another approach is to encode the data in accordance with a redundant encoding scheme, such as a Reed-Solomon code, using a code generator polynomial known to both the transmitter and the receiver. Depending upon the amount of redundancy present in each codeword, a number of codeword symbols may be lost in transmission but still be reconstructed by the receiver in a most reliable fashion. This technique also suffers from the limitation that it ignores the fact that the most usable frequency in the band varies in time. It also suffers from the limitation that the decoding utterly breaks down whenever the number of erasures (due to fading or channel noise, etc.) exceeds the number of redundant symbols in the codeword.

SUMMARY OF THE INVENTION

In the invention, the n symbols of a codeword of length n are transmitted simultaneously on n separate frequencies or channels. The receiver includes a plurality of n equalizers or transversal filters receiving the signals transmitted on the n channels, respectively. The n equalizers each comprise a feedforward register and a feedback register, each of the multiple storage locations therein being associated with its own multiplier and a multiplier ("tap") coefficient. The set of all such tap coefficients may be thought of as the taps on a transversal filter. The n equalizer outputs are connected to the n inputs of an error correction decoder. The error correction decoder views the n equalizer outputs as n symbols of an undecoded codeword. It decodes these symbols to find any errors or erasures in the received codeword and produces the n symbols of the originally transmitted codeword at its n outputs (provided the number of erasures plus twice the number of errors does not exceed the number of redundant symbols in the codeword).

Successive corrected symbols from each decoder output are stored in the feedback register of a respective equalizer. The feedforward register of each equalizer stores a successive number of signal samples received from a respective one of the n channels. The number of samples and symbols thus stored for each channel is preferably determined in accordance with a rough estimate of the impulse function response time of the channels.

The multiplier tap coefficients of each of the equalizers is constantly revised, once each codeword time, by an update processor responsive to a comparison between each received signal sample and the corresponding decoded (correct) symbol produced later by the decoder. Each equalizer produces an equalized (or predictively corrected) version of the last received symbol sample by multiplying the current contents of its feedforward and feedback registers by the respective tap coefficients and combining the resulting products.

In the preferred embodiment of the invention, the error correction decoder is a soft decision Reed-Solomon decoder of the type disclosed in U.S. patent application Ser. No. 113,579 filed Oct. 26, 1987, by Elwyn R. Berlekamp and entitled "Soft Decision Reed-Solomon Decoder".

preferably, each update processor executes the Kalman algorithm, which takes into account the difference between the equalized version of the last received signal sample and the corresponding decoded symbol. In this embodiment, n Kalman algorithms are executed simultaneously by the n update processors so as to update n sets of feedforward and feedback multiplier tap coefficients once each codeword time.

DESCRIPTION OF THE DRAWINGS

The invention is best understood by reference to the accompanying drawings, of which.

DETAILED DESCRIPTION

Figure 1:
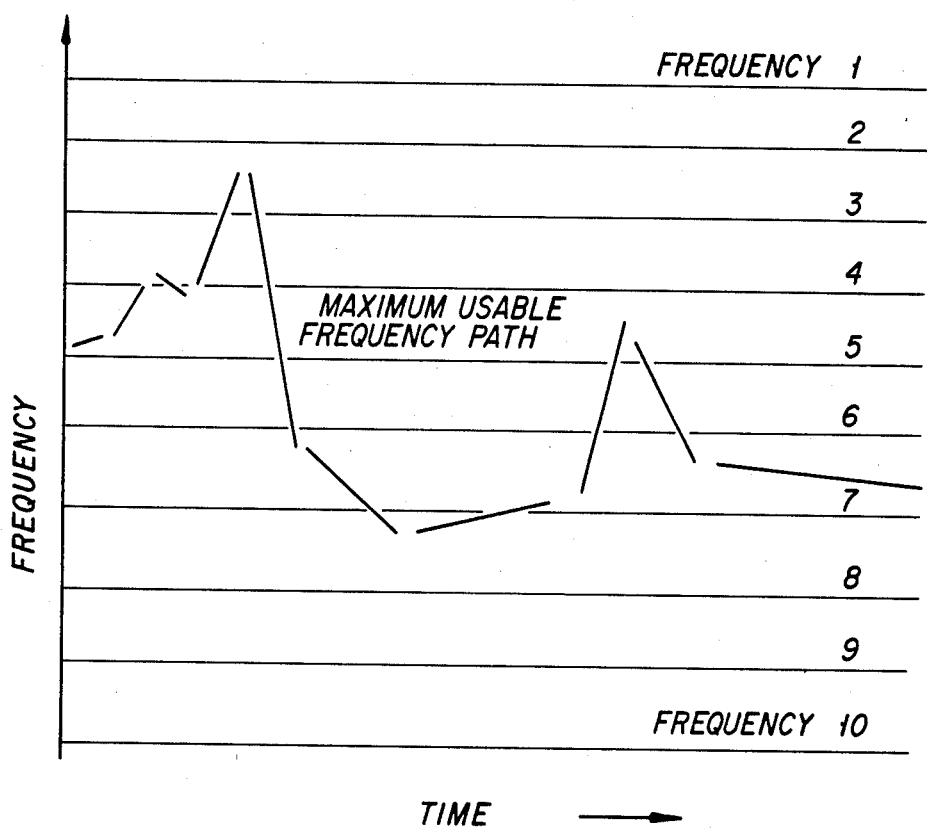
FIG. 1 is a graph illustrating the rapid variation in time of the maximum usable frequency in a high frequency band.

FIG. 1 illustrates the deviation as a function of time of the maximum usable frequency in a band of ten frequencies. The ten frequencies are ideally separated by a communication bandwidth required by the user. Since the change in maximum usable frequency with time illustrated in FIG. 1 is not predictable, well-known techniques such as random frequency hopping do not offer a solution to the problem.

Figure 2:
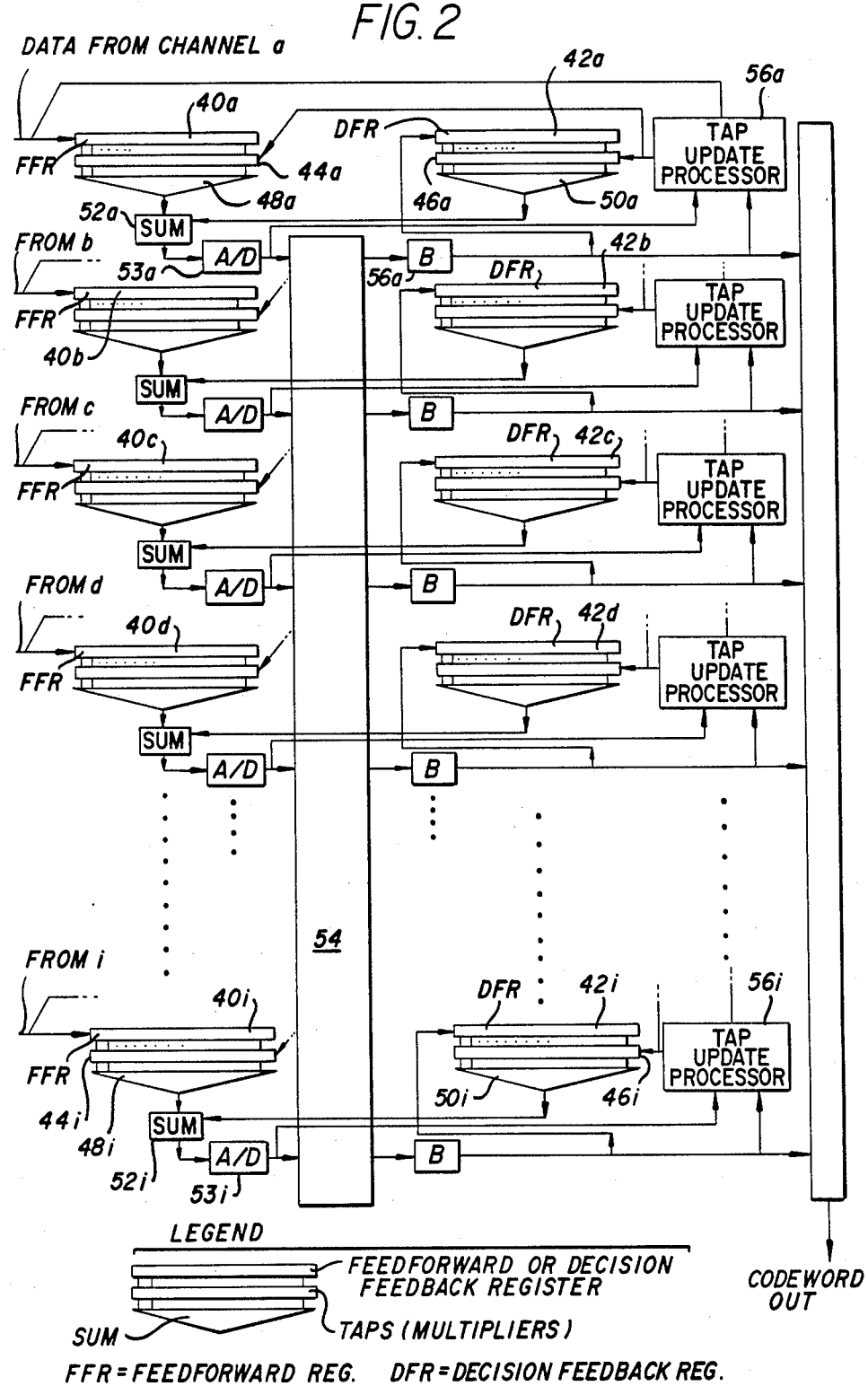
FIG. 2 is a block diagram illustrating the multi-channel parallel equalizer and decoder of the invention.

Referring to FIG. 2, a codeword comprising seven symbols is transmitted on different frequencies or different channels, each of the codeword symbols being transmitted on its own frequency or channel simultaneously with all the other symbols of the codeword. The receiver illustrated in FIG. 2 receives the transmitted symbols on each of the n channels simultaneously. For each channel, the receiver includes a feedforward register 40, a feedforward tap register 44, a feedforward adder 48, a decision feedback register 42, a feedback tap register 46, a feedback adder 50 and a final adder 52. There are n of these components, which together comprise the n equalizers of the receiver of FIG. 2. The receiver further includes an error correcting decoder 54 having n symbol inputs and n symbol outputs. The received signal samples from each of the n channels are stored successively in each of the respective feedforward registers 40. The feedforward registers 40 are all shifted from left to right once each codeword time. The contents of each feedforward register 40 is multiplied by the contents of each corresponding tap register 44, and the resulting products are combined in each adder 48 to produce a feedforward sum. For example, if each of the feedforward registers 40 is long enough to retain the fifteen last received signal samples (so that its length m, is 15 symbols), then the tap registers 44 each contain a respective set of fifteen multiplier coefficients, and each adder 48 receives fifteen individual products which it combines together into a feedforward sum of products.

Each of the n outputs of the error correction decoder 54 is furnished to a respective one of the decision feedback registers 42. Thus, each decision feedback register 42 stores successive corrected codeword symbols from a respective one of the n outputs of the error correcting decoder 54. If each decision feedback register 42 is sufficiently long enough to store the fifteen most recent decoded symbols (for example) (so that its length, r, is 15 symbols), then each of the feedback tap registers 46 stores its own set of fifteen multiplier coefficients, and each of the feedback adders 50 receives fifteen products which it combines into a feedback sum of products. Each of the n sets of feedforward and feedback sum of products are combined in respective ones of the n final adders 52, the final results comprising n equalized versions of the last received signal samples from the n channels. These equalized signal samples are each input to a respective one of the n inputs of the error correcting decoder 54.

The error correcting decoder 54 treats these n equalized signal samples as a codeword of n symbols requiring correction in accordance with a codeword generator polynomial. Preferably, the error correcting decoder is a soft decision decoder such as that described in U.S. patent application Ser. No. 113,579 filed Oct. 26, 1987 by Elwyn R. Berlekamp and entitled "Soft Decision Reed-Solomon Decoder." This type of decoder views each of the n received signal samples as being more or less reliable, depending upon the degree of resemblance of each sample to any one of the set of allowed codeword symbols in the code. Preferably, each equalized signal sample received from the n adders 52 is first digitized by respective ones of n analog-to-digital converters 53 before being furnished to the decoder 54. (In one embodiment, the received signal samples are modulated—as in QPSK modulation, for example—and each of the converters 153 is a demodulator.)

ASSESSING EQUALIZER PERFORMANCE

The n differences between the corrected codeword symbols present at the n decoder outputs and the n received signal samples from which they were generated provide a measure of the relative performance of each of the n equalizers. Specifically, if the multiplier coefficients contained in each of the feedforward tap registers 44 and each of the feedback tap registers 46 are more or less in error, then these differences will be more or less large, suggesting a relative need for correction of the multiplier coefficients in various ones of the equalizers. Thus, for each new codeword received at the receiver of FIG. 2 and decoded in the decoder 54, a new measure of performance of each of the n equalizers is available. Ideally, the contents of the tap registers 44 and 46 should be updated in accordance with the most recent performance evaluations.

UPDATING THE MULTIPLIER COEFFICIENTS

A plurality of n tap update processors 56, associated with each of the n equalizers, revise the contents of respective ones of the set of n feedforward tap registers 44 and the set of n feedback tap registers 46. Each tap update processor 56 receives a respective one of the n latest equalized signal samples and a corresponding one of the n corrected symbols generated by the error correction decoder 54. (The tap update processor 56 may also receive a respective one of the latest n received signal samples.) Each tap update processor 56 uses this information to compute a revision for each of the multiplier coefficients contained in a respective one of the n feedforward tap registers 44 and the n feedback tap registers 46. Preferably, the tap update processor 56 executes the Kalman algorithm. The Kalman algorithm is described in detail by John G. Proakis, *Digital Communications*, McGraw-Hill, Inc., 1983, beginning at page 413. However, other algorithms are known in the art which may be chosen for execution by each of the tap update processors 56.

Thus, the n equalizers of FIG. 2 adapt their individual n equalization processes in real time in accordance with the latest channel characteristics and in accordance with the latest available performance measurement of each of them.

KALMAN ALGORITHM FOR UPDATING THE FEEDFORWARD AND FEEDBACK MULTIPLIER COEFFICIENTS

The following is a brief summary of the Kalman algorithm, which is provided herein for the sake of completeness.

In order to summarize the algorithm, the following definitions are necessary:

Each feedforward register has M positions and each feedback register has R positions.

The combined content of the M+R register positions of the pair of feedforward and feedback registers in one of the N equalizers at any particular time t is defined as an M+R=N dimensional vector $Y_N(t)$.

The M+R multiplier ("tap") coefficients stored in the corresponding pair of feedforward and feedback tap registers of one of the N equalizers at time t is defined as an M+R dimensional vector $C_N(t)$.

The transpose of the vector $Y_N(t)$ is denoted as $Y'_N(t)$.

The $i^{th}$ component of the vector $Y_N(t)$ is denoted as $Y_i(t)$.

An inverse signal auto-correlation matrix is denoted as $P_N(t)$ and has M+R columns and M+R rows.

This matrix is defined in accordance with a time weighting factor w which is greater than 0 but no greater than 1, as follows:

$$P_N(t) = \left( \sum_{t'=0}^{t} w^{t-t'} Y_N(t')Y_N'(t') \right)^{-1}.$$

The corrected symbol generated by the error corrector at the corresponding one of its n outputs in response to the equalized version of the signal sample received at time t is denoted as I(t).

From the foregoing definitions, the Kalman algorithm for one of the N equalizers may be described as follows:

(1) Compute output:

$$\hat{I}(t) = Y'_N(t)C_N(t-1).$$

(2) Compute error:

$$e_N(t) = \hat{I}(t).$$

(3) Compute Kalman gain vector:

$$K_N(t) = \frac{P_N(t-1) Y_N(t)}{w + Y'_N(t)P_N(t-1)Y_N(t)}.$$

(4) Update inverse auto-correlation matrix:

$$P_N(t) = \frac{1}{w} [P_N(t-1) - K_N(t)Y'_N(t)P_N(t-1)].$$

(5) Update coefficients:

$$C_N(t) = C_N(t-1) + K_N(t)e_N(t).$$

(6) Shift the contents of the feedforward and feedback registers by one position.

(7) Insert I(t) into the left-most feedback register position and insert the next received signal sample into the left-most feedforward register position.

(8) t becomes t+1.

(9) Return to (1).

The equalizer tap coefficients C(t) change each codeword time by an amount equal to the error $e_N(t)$ multiplied by the Kalman gain vector $K_N(t)$. Since $K_N(t)$ is N-dimensional, each of the N tap coefficients in effect is controlled by a corresponding one of the N elements of $K_N(t)$.

OVERALL PERFORMANCE

As long as the redundancy of the code used by the transmitter and the decoder 54 at the receiver is sufficient to correct t erroneous symbols in each received codeword, then a limited number (t) of the n channels may "drop out" without any loss of data at the output of the error correcting decoder 54. This performance may be enhanced if the error correcting decoder is of the soft decision decoder variety described in the above-referenced patent application by Berlekamp. If such a soft decision decoder is a soft decision Reed-Solomon decoder and if it treats the 2t least reliable symbols as erasures, then there may be as many erasures as there are redundant symbols in each codeword with no loss of data at the decoder output. As described in the referenced application by Berlekamp, the relative reliabilities of the n received symbols are determined by their respective resemblances to the closest allowed symbols of the code. Referring to FIG. 1, as long as the number of usable frequencies or channels adjacent the maximum usable channel is at least equal to n−t at any instant in time, then no loss of data can occur at the output of the error correction decoder 54.

The multi-channel parallel equalizer of FIG. 2 solves two problems, namely fading in a given channel (by the use of an independent equalizer for that channel) and dropout of various channels in a band of channels (by encoding across a slice of all of the channels).

While the invention has been described in detail with specific reference to preferred embodiments thereof, it is understood that variations and modifications thereof may be made without departing from the spirit and scope of the invention.

What is claimed is:

1. A multiple channel parallel equalizer system adapted to decode a codeword of length n whose n symbols have been transmitted and received on n separate channels, said equalizer system comprising:

an error correction decoder having n inputs adapted to receive equalized versions of said n received codeword symbols and n decoder outputs adapted to transmit n corrected codeword symbols computed therefrom in accordance with a code generator polynomial;

n equalizers, each of said n equalizers comprising:

feedforward means providing a feedforward sum based on the combination of m ones of said codeword symbols received from the corresponding one of said n channels and a set of m feedforward multiplier coefficients;

feedback means for combining r ones of said corrected symbols received from a respective one of said n decoder outputs with a set of r feedback multiplier coefficients so as to provide a feedback sum of products therefrom, means for combining said feedback and feedforward sums together to produce said equalized version of the last received codeword symbol of the corresponding one of said n channels and transmitting said equalized version to the corresponding one of said n decoder inputs.

2. The equalizer of claim 1, wherein said n equalizer means each further comprise:

a tap update processor adapted to compare said equalized version of said received codeword symbol with the corresponding corrected codeword symbol, and for computing therefrom a revised version of each of the corresponding set of feedforward and feedback multiplier coefficients in accordance with a least means squares recursive algorithm, whereby there are n feedforward means, n feedback means and n tap update processor means individually associated with corresponding ones of the n channels, and whereby said n sets of coefficients are separately updated by said n tap update processors so as to accommodate the latest estimates of equalizer performance and changes in channel characteristics.

3. A multiple channel parallel equalizer adapted to receive the n symbols of a codeword of length n from n separate channels, said equalizer comprising:

means for decoding equalized versions of the n received codeword symbols so as to produce n corrected codeword symbols therefrom in accordance with a codeword generator polynomial;

means for providing n feedforward sums from the combination of n successions of received codeword symbols from said n channels with n sets of feedforward coefficients;

means for computing n feedback sums from the combination of n successions of corrected codeword symbols from said n decoder outputs with n sets of feedback multiplier coefficients;

means for combining n pairs of feedforward and feedback sums independently to generate said equalized versions of said n codeword symbols and transmitting them to said decoder.

4. The equalizer of claim 3 further comprising means for revising each of said n sets of feedforward and feedback coefficients independently based upon separate comparisons of said equalized versions of said n received codeword symbols with corresponding ones of the n corrected codeword symbols.

5. The equalizer of claim 3 wherein said means for decoding comprises a soft decision decoder with the ability to correct 2t erasures of known location in the absence of other errors in a given codeword, and which treats as many as 2t of the n received symbols least resembling an allowed symbol as 2t erasures in the received codeword.

6. A multiple channel parallel equalizer adapted to receive the n symbols of a codeword of length n from n separate channels, said equalizer comprising:

a decoder implementing a code generator polynomial and having n codeword symbol inputs and n codeword symbol outputs;

means for providing n feedforward signals from n sets of m successively received codeword symbols received from respective ones of said n channels, in accordance with n respective feedforward transformations;

means for providing n feedback symbols from n sets of r successive corrected codeword symbols received from respective ones of said n decoder outputs, in accordance with n respective feedback transformations; and means for combining said n feedforward signals with respective ones of said n feedback signals to provide n equalized codeword symbols to respective ones of said n decoder inputs.

7. The equalizer of claim 6 further comprising means for adapting said n feedforward transformations and said n feedback transformations individually, in response to individual comparisons of corresponding ones of said n equalized codeword symbols with corresponding ones of said n corrected codeword symbols as often as once for each codeword received on said n separate channels.

8. The equalizer and decoder of claim 7 wherein said means for adapting said transformations executes a recursive least means square algorithm.

* * * * *